(No Model.)
J. J. C. & M. SMITH.
PROCESS OF MAKING ELECTRIC CABLES.
No. 343,081. Patented June 1, 1886.
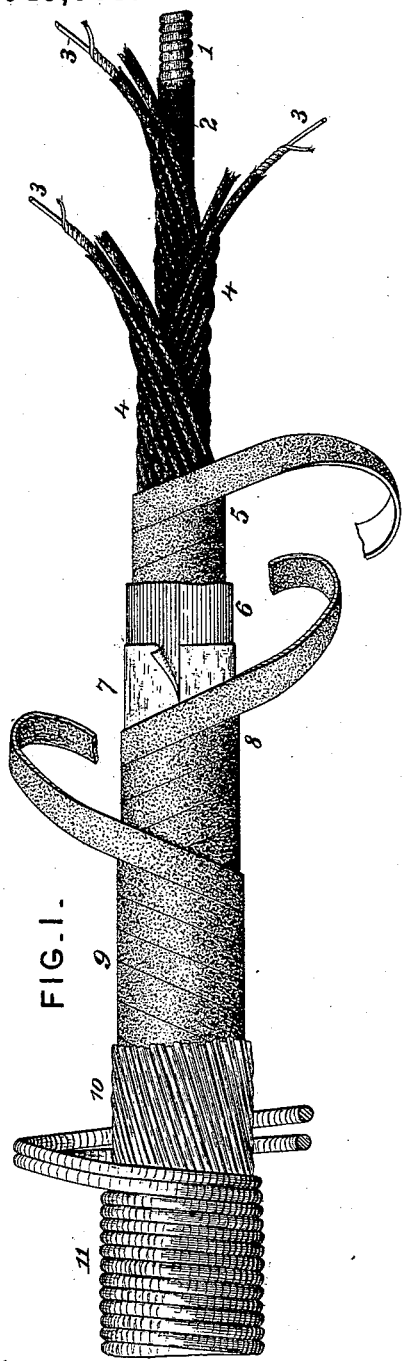
FIG. I.
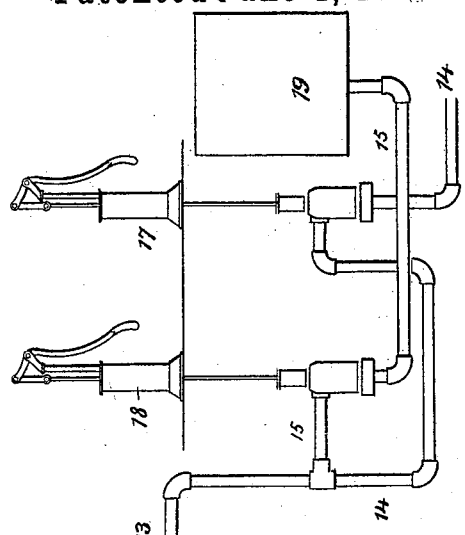
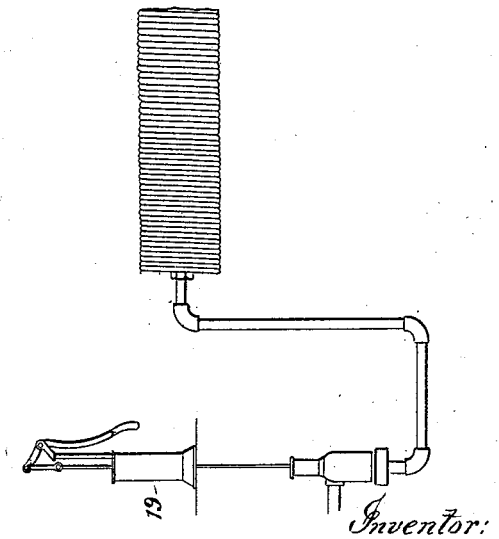
FIG. II.
Attest:
Geo. T. Smallwood.
F. A. Hopkins
Inventor:
John J. C. Smith.
Michael Smith.
By Knight Bros. attys.

UNITED STATES PATENT OFFICE.

JOHN JOSEPH CHARLES SMITH AND MICHAEL SMITH, OF PASSAIC, NEW JERSEY; SAID JOHN JOSEPH CHARLES SMITH ASSIGNOR TO JOHN H. CHEEVER, OF NEW YORK, N. Y.

PROCESS OF MAKING ELECTRIC CABLES.

SPECIFICATION forming part of Letters Patent No. 343,081, dated June 1, 1886.

Application filed September 5, 1885. Serial No. 176,258. (No model.)

*To all whom it may concern:*

Be it known that we, JOHN JOSEPH CHARLES SMITH and MICHAEL SMITH, citizens of the United States, both residing at Passaic, in the county of Passaic and State of New Jersey, have invented a new and useful Process for Making Electric Conducting-Cables for Telegraphic and Telephonic Purposes, of which the following is a specification.

The purpose of this invention is the production of a cable for underground, submarine, and aerial uses, containing any desirable number of conducting-wires effectually and permanently insulated from each other and from external influences, and so effectually protected against mechanical injury that the said cable may be laid under ground with entire safety without a containing tube or conduit.

To this end our process in its most complete form consists in providing a central hollow core, preferably of coiled wire, surrounding this with any desirable number of conducting-wires, covered with cotton and laid in one or more coils, according to the desired capacity of the cable, enveloping the coil or coils of conducting-wires with an impervious cover of vulcanizable material protected by cloth or other suitable material from cohering to the covered wires and wrapped around and vulcanized upon the said body of wires, the interior of the cable being protected from moisture during the vulcanizing operation, surrounding this with an armor of spirally-coiled wire, serving as a protection from mechanical injury, and adapted to resist internal pressure, forcing hot air into or through the cable to remove any moisture therefrom, then exhausting the air, and finally forcing a suitable insulating material in a melted state into the hollow core and out through the walls thereof with sufficient pressure to completely fill the interstices between the core, conducting-wires, and envelope. Some of these steps may, however, be dispensed with without departing from or disusing other new and useful features of our invention. It is also proper to state that some of the manipulations employed in the manufacture of our cable are not new; but our combination of the old with new features which we have originated constitutes a novel and valuable art or system of manufacturing a cable having a number of insulated electric conductors.

Our improved cable, as a manufacture, is made the subject of a separate application for Letters Patent, Serial No. 176,259, filed at even date herewith.

In order that the art or process of making the said cable may be fully understood, we will proceed to describe the same with reference to the accompanying drawings, which represent the cable in various stages of its manufacture, and also illustrate certain special apparatus employed in introducing the melted insulating material.

In the accompanying drawings, Figure I is a view of our improved cable with its parts separated at one end so as to assist in exemplifying the different stages or process of manufacture. Fig. II represents a portion or section of the cable completed, in readiness for filling, and illustrates suitable apparatus which may be used in this operation.

In carrying out our invention, we make a flexible hollow core, 1, by winding a No. 14 wire to a close spiral, continuing this to any length desired for the cable. Instead of this we may form the core of a perforated lead pipe; but we prefer to use a spiral hollow core formed of wire, as first specified. This hollow core we cover with a layer of cotton thread, 2, by braiding. We then take any desirable number of copper wires, 3, which are to form the conductors, and cover them with two or more layers of cotton thread, 4, one layer by winding, the next by braiding. The covered wires are then laid around the covered flexible tube by means of a cabling-machine in sufficient number to fully surround and cover the flexible tube. In order to insure uniform flexibility in the cable, the covered conducting-wires are laid in a long winding spiral, as is usual in laying electric conductors around a core. The first layer of cotton-covered wire is followed by a second, wound around the center in the opposite direction, and the second may be followed by a third, and so on, according to the number of conductors required in the cable. When the desired number of conductors are thus laid up in the cable, we surround and firmly bind together the whole body of covered conducting-wires with a layer of tape, 5, made from cotton cloth, rubbed over on one side with rubber composition. We lay this tape with the cloth face on the inside next to the cotton-covered wires and the rubber-covered side on the exterior. We next proceed to cover the cable thus far formed with a layer of insulating-rubber compound, 6, about one sixteenth of an inch thick. This rubber compound is best applied in the form of a longitudinal strip in the same manner and with a machine similar to that employed in applying a rubber covering to a single conductor, as described in Letters Patent Nos. 276,724 and 276,725, granted to J. J. C. Smith, the 1st day of May, 1883, and in connection with this rubber cover we also apply metal foil 7 in the manner and for the purpose described in Letters Patent No. 317,587, granted to J. J. C. Smith and Michael Smith, jointly, the 12th day of May, 1885. We leave the metal foil in position on the outside of the insulating-rubber compound, and then proceed to cover this with a layer of cotton tape, 8, rubbed over on both sides with rubber compound. The tape is wound spirally around the cable and is followed by a second layer, 9, of similar tape, wound in the opposite direction, so as to cross the joints. When these two layers of tape are applied the formation of the cable is far enough advanced to be ready for a partial vulcanization of the insulating-rubber cover. To effect this we wind the cable on a large drum, hermetically close the ends of the cable to prevent the entrance of steam within the impervious insulating cover, which would have the deleterious effect of moistening the cotton around the wires, and place the drum and cable in a proper vulcanizing-vessel. The drum is slowly revolved during vulcanization in order that the desired effect may be produced upon all parts of the cable, and especially to prevent any unequal settling of the parts by gravity, which might impair the symmetry of the cable and produce inequalities in thickness in the insulating covering of the body of conducting-wires. The heat is produced by steam at a temperature of 250° for forty minutes. The drum, with the cable coiled upon it, being then removed from the vulcanizer, we have a cable combining two valuable features—to wit: first, a hollow flexible center with numerous openings in its walls; and, second, a number of conducting-wires, each separated from the rest by cotton, but all of them surrounded and firmly held together by an envelope, which serves not only as an outside insulator for the conductors, but also as an exceedingly flexible and absolutely waterproof covering, made still more impervious by a layer of metal foil which surrounds and tightly envelops it, and it is further protected by a double layer of tape.

The next step in our process is to cover the cable with a metal armor to protect it against mechanical injury and to prevent any rupture or distortion of the insulating-envelope around the body of conducting-wires in the operation of introducing insulating material in a melted state and under high pressure, as hereinafter explained.

Our metal armor is made double in two layers of wire of different thicknesses applied in the following manner, specially devised to combine flexibility with effectual protection: We first put on a covering or armor, 10, consisting of a great number of fine iron wires, all of which we wind at once spirally around the cable, making one turn to about every five or six inches, closely enough to cover the surface of the cable completely. This first armor is succeeded by a second one, 11, consisting of two heavier wires of about one-eighth inch in diameter. These two wires are wound side by side over the first armor in regular spiral turns, covering the cable solidly and completely, but nevertheless making a very flexible cable. The object of this double armor is to serve two very important purposes, as explained hereinafter.

When the cable is armored, we proceed to fill the interior space left between the wires, cotton, and covering with a good insulating material, 12, which will become fluid by heat and congeal at a temperature of about 140°. For this filling paraffine, rosin, &c., may be used; but we prefer either ozocerite or earth-wax, or a mixture of two parts ozocerite with two parts rosin and one part dissolved rubber in benzine, mixed with the ozocerite and rosin when melted. The filling of the cable with said mixture we accomplish in this manner: The cable is wound on a large drum, and each end of the cable is provided with a proper metallic coupling. The coupling 13 at one end is so arranged as to quickly and perfectly connect the hollow core of the cable with the supply-pipes 14 15 from two force-pumps, 17 and 18, the first being an air-pump, the other a pump for the liquid insulating material. The other end of the cable is connected with a suction air-pump, 19. When the cable is so arranged, we force up dry air through the interior of the cable, which passes freely through the center hollow core, and as the walls of the flexible tube permit a free escape of the air it passes freely through the interstices of the cotton surrounding each wire. The hot air is passed through to heat up the wires and cotton and make the cotton perfectly dry. This is kept up for about half an hour. Then the air is shut off. The air-exhaust pump 19 on the other end of the cable is then set in operation, which will quickly remove the air from the interior of the cable. When the air is exhausted, the force-pump 18, which is connected with a vessel, 19, containing a supply of melted ozocerite, is brought in connection with the end of the cable, and the interior of the cable is completely filled with the melted ozocerite. Pressure is applied to the melted ozocerite by means of the force-pump, which may be brought to about two hundred pounds to the square inch, so as to make sure that the ozocerite will penetrate into every interstice and pore which may exist between the wires, threads of cotton, and the outside covering. When this is done the cable is allowed to cool off, to solidify the ozocerite, and is ready for use.

Having thus described our invention, the following is what we claim as new therein and desire to secure by Letters Patent:

1. The process of making an electric conducting-cable, the same consisting in laying the conducting-wires around a hollow core adapted for the forcing through it of insulating material in a melted state, covering the said wires with an impervious envelope of insulating material, and subsequently filling the interstices between the conducting-wires, envelope, and core with insulating material forced in in a melted state, as explained.

2. The process of making an electric conducting-cable, the same consisting in laying the conducting-wires around a hollow core adapted for the forcing through it of insulating material in a melted state, covering the said wires with an envelope of vulcanizable material, vulcanizing or partially vulcanizing the envelope by moist heat applied to the outside only and excluded from the interior, and then forcing into the core a body of insulating material in a melted state, to fill the interstices, substantially as set forth.

3. The process of making an electric conducting-cable, the same consisting in laying covered conducting-wires around a hollow core adapted for the passing through its walls of material in a melted or semi-liquid state, enveloping the coil or body of conducting-wires with vulcanizable material separated from them by fibrous material to prevent cohesion, then vulcanizing or partially vulcanizing the envelope, and subsequently filling the interstices between the covered wires, envelope, and core with material forced in in a melted or semi-liquid state through the hollow core.

4. The process of making an electric conducting-cable, the same consisting in laying conducting-wires around a central hollow core adapted to permit the passage through its walls of liquid or semi-liquid matter, covering the body of conducting-wires with an impervious envelope, surrounding this with a spiral armor of wire, for the purpose of protecting the cable against mechanical injury and resisting internal pressure, and then forcing into the hollow core and out through the walls thereof melted or semi-liquid matter to fill the interstices between the conducting-wires, envelope, and core.

5. The process of making an electric conducting-cable, the same consisting in wrapping insulated conducting-wires around a hollow core, enveloping the body of wires in a sheet of vulcanizable material, and subsequently vulcanizing the same by moist heat applied to the outside only and excluded from the interior.

6. The process of making an electric conducting-cable, the same consisting in wrapping covered conducting-wires around a hollow core adapted for the passage through its walls of liquid or melted matter, covering the body of conducting-wires with an impervious envelope, forcing heated air through the core to remove moisture from the space around and between the conducting-wires, and finally exhausting the air and forcing in a body of insulating material in a melted state to fill the interstices between the impervious envelope, conducting-wires, and hollow core.

JOHN JOS. CHAS. SMITH.
MICHAEL SMITH.

Witnesses:
JOHN B. PUDNEY,
EUGENE C. SMITH.